United States Patent
Baker

(10) Patent No.: US 9,132,838 B2
(45) Date of Patent: Sep. 15, 2015

(54) ROTARY POWER TRANSMISSION JOINT WITH AN INTEGRATED WIRELESS SENSOR

(71) Applicant: Douglas M. Baker, Ypsilanti, MI (US)

(72) Inventor: Douglas M. Baker, Ypsilanti, MI (US)

( * ) Notice: Subject to any disclaimer, the term of this patent is extended or adjusted under 35 U.S.C. 154(b) by 66 days.

(21) Appl. No.: 14/029,742

(22) Filed: Sep. 17, 2013

(65) Prior Publication Data

US 2014/0188353 A1 Jul. 3, 2014

Related U.S. Application Data

(60) Provisional application No. 61/701,893, filed on Sep. 17, 2012.

(51) Int. Cl.
*B60W 10/26* (2006.01)
*B60W 40/13* (2012.01)

(52) U.S. Cl.
CPC ......... *B60W 40/13* (2013.01); *B60W 2510/105* (2013.01); *B60W 2510/107* (2013.01); *B60Y 2300/207* (2013.01); *B60Y 2400/307* (2013.01); *B60Y 2400/3044* (2013.01)

(58) Field of Classification Search
CPC ............ B60W 10/26; B60W 2420/10; B60W 2420/22; B60W 2422/00
See application file for complete search history.

(56) References Cited

U.S. PATENT DOCUMENTS

| | | | |
|---|---|---|---|
| 4,838,077 A | 6/1989 | Johnson et al. | |
| 5,736,938 A | 4/1998 | Ruthroff | |
| 5,801,644 A | 9/1998 | Ruthroff | |
| 5,837,909 A | 11/1998 | Bill et al. | |
| 6,123,163 A * | 9/2000 | Otsu et al. | 180/65.8 |
| 6,191,687 B1 | 2/2001 | Dlugos et al. | |
| 6,259,372 B1 | 7/2001 | Taranowski et al. | |
| 6,304,176 B1 | 10/2001 | Discenzo | |
| 6,632,252 B1 | 10/2003 | Kyrtsos | |
| 7,081,693 B2 | 7/2006 | Hamel et al. | |
| 7,170,201 B2 | 1/2007 | Hamel et al. | |
| 7,256,505 B2 | 8/2007 | Arms et al. | |
| 7,256,695 B2 | 8/2007 | Hamel et al. | |
| 7,361,998 B2 | 4/2008 | Hamel et al. | |
| 7,365,455 B2 | 4/2008 | Hamel et al. | |
| 7,429,805 B2 | 9/2008 | Hamel et al. | |
| 7,612,665 B2 | 11/2009 | Okada et al. | |
| 7,698,959 B2 | 4/2010 | Raymond et al. | |
| 8,011,255 B2 | 9/2011 | Arms et al. | |
| 2008/0160937 A1 * | 7/2008 | Baker et al. | 455/127.5 |

FOREIGN PATENT DOCUMENTS

| | | |
|---|---|---|
| EP | 1022702 A2 | 7/2000 |
| EP | 2237004 A1 | 6/2010 |
| EP | 2237004 A1 | 10/2010 |

* cited by examiner

*Primary Examiner* — Edwin A Young
(74) *Attorney, Agent, or Firm* — Dickinson Wright PLLC

(57) ABSTRACT

An assembly for acquiring operational data from a machine including a power generating device and a rotating component interconnected with the power generating device for transmitting power from the power generating device. The assembly comprises a sensor assembly for being interconnected with the rotating component for sensing the operational data of the vehicle that includes at least one accelerometer for measuring the rotational speed of the rotating component, a temperature sensor for measuring the temperature of the rotating component, a pressure sensor for measuring the fluid pressure adjacent to the joint, a strain gauge for being interconnected with the rotating component for detecting the strain on the rotating component. The assembly further comprises an energy harvesting assembly for harvesting energy from the rotating component to provide electric power to the sensor assembly.

20 Claims, 8 Drawing Sheets

ROTARY POWER TRANSMISSION JOINT WITH AN INTEGRATED WIRELESS SENSOR

CROSS REFERENCE TO RELATED APPLICATION

This application claims the benefit of application Ser. No. 61/701,893 filed Sep. 17, 2012 which is hereby incorporated by reference as though set forth fully herein.

BACKGROUND OF THE INVENTION

1. Field of the Invention

An assembly for acquiring operational data from a machine including a power generating device and a rotating component interconnected with the power generating device for transmitting power from the power generating device.

2. Description of the Prior Art

Assemblies for acquiring operational data from a machine including a power generating device and a rotating component interconnected with the power generating device for transmitting power from the power generating device are generally known in the art, especially in the field of vehicles using engines to generate power. One such Assembly is disclosed in U.S. Pat. No. 6,632,252 to Christos T. Kyrtsos, which includes a sensor assembly for being interconnected with a vehicle for transmitting temperature data. The sensor assembly includes an energy harvesting assembly for harvesting ambient energy using an inductive configuration for powering the sensor assembly.

There remains a need for improvements in such assemblies to wirelessly monitor additional types of operational data to improve operation of such machines. With regard to vehicles, there remains a need for improvements that lead to increased fuel economy and longer vehicle life. Further there remains a need for more compact wireless assemblies that have components that are protected from ambient forces.

SUMMARY AND ADVANTAGES OF THE DISCLOSURE

An assembly for acquiring operational data from a machine including a power generating device and a rotating component interconnected with the power generating device for transmitting power from the power generating device. The assembly comprises a sensor assembly for being interconnected with the rotating component for sensing the operational data of the machine. The sensor assembly includes a microprocessor for receiving and interpreting the operational data, at least one accelerometer for measuring the rotational speed of the rotating component to determine the horsepower being transmitted through the rotating component and for measuring vibrations of the rotating component, at least one temperature sensor for being interconnected with the rotating component for measuring the temperature of the rotating component, at least one pressure sensor for being interconnected with the rotating component for measuring the pressure of the air adjacent to the joint, at least one strain gauge for being interconnected with the rotating component for detecting the torsional strain on the rotating component and for determining horsepower, and at least one transceiver for communicating data signal and operational instructions to a transceiver base unit. The assembly further comprises an energy harvesting assembly for being interconnected with the rotating component and electrically connected with the sensor assembly for harvesting energy from the rotating component to provide electric power to the sensor assembly.

Thus several advantages of one or more aspects of the disclosure are that the disclosure provides for a wireless assembly that can be incorporated into a rotating component of a machine to monitor torque, RPM's, horsepower, acceleration, temperature and pressure without the need to connect to the primary battery of the machine. Further, the disclosure provides for a pre-calibrated torque joint instrument that can be built and readily installed in shaft power applications without the need for system calibration of strain rate after installation. Furthermore, the disclosure provides for a sensor assembly that is protected from external forces. Additionally, the disclosure provides for real time corrected horsepower of the power generating component through measured horsepower transmitted through the rotating component, by means of air density measurements taken through temperature and pressure sensors. In addition, the disclosure provides for early detection and failure detection of the rotating part through the strain gauges, accelerometer, and temperature sensor.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE ENABLING EMBODIMENTS

Figure 1:
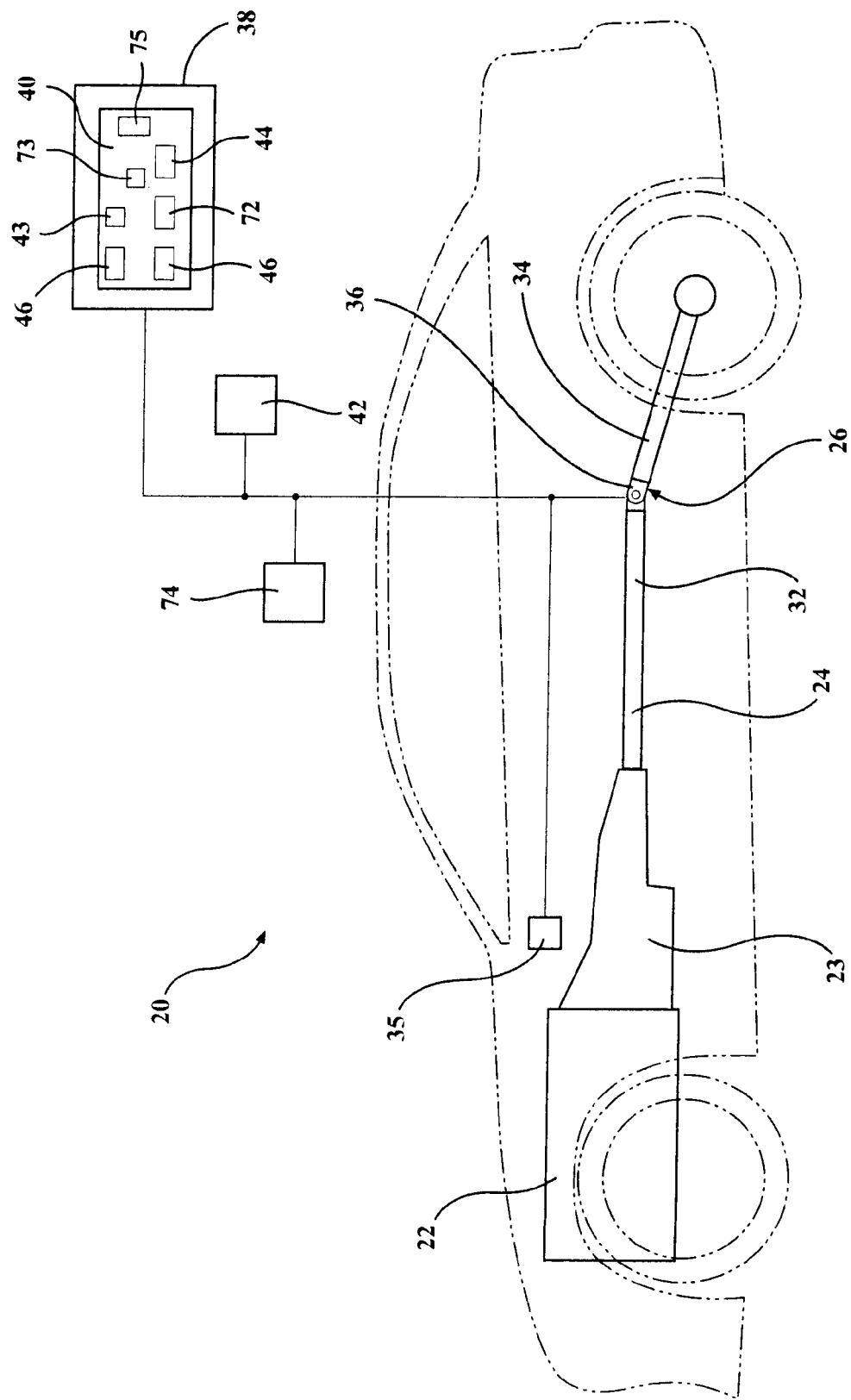
FIG. 1 is a schematic of the assembly.
Figure 2:
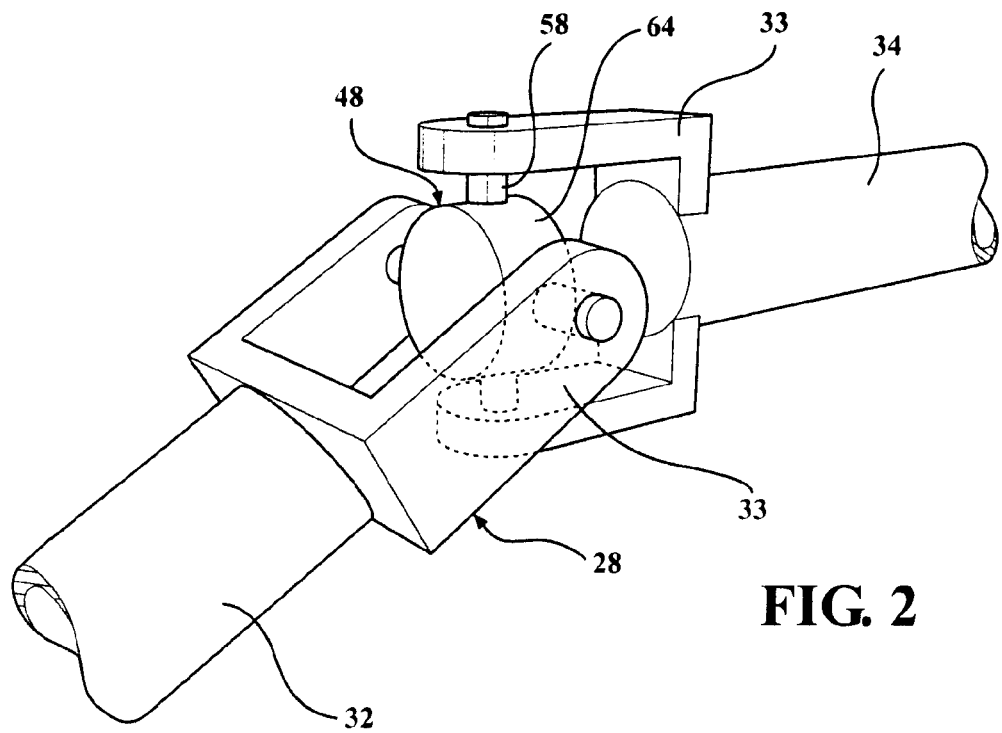
FIG. 2 is a perspective view of a Cardan universal joint.
Figure 4:
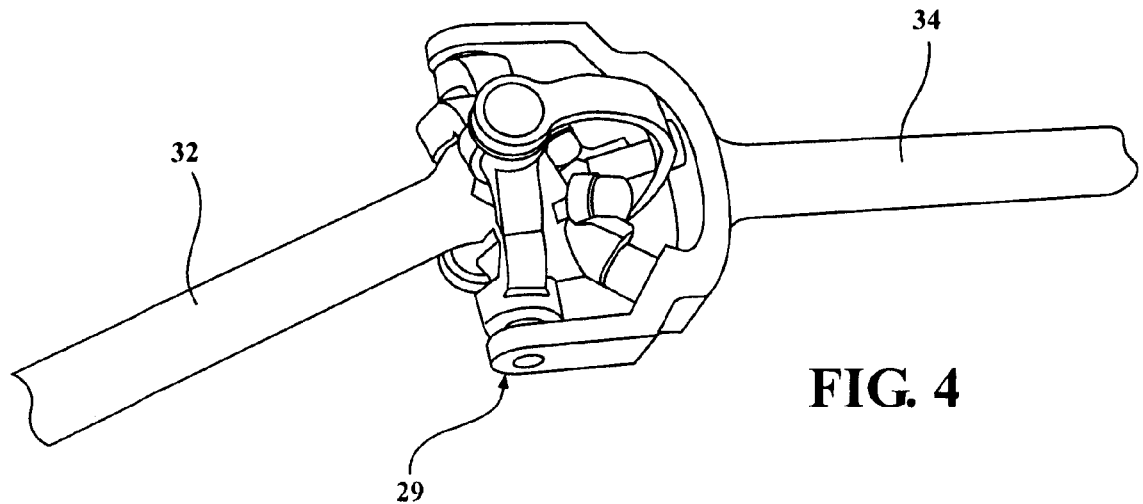
FIG. 4 is a perspective view of a Thompson constant velocity joint.

Referring to the Figures, wherein like numerals indicate corresponding parts throughout the several views, an assembly 20 is generally shown for acquiring operational data such as torque, acceleration, temperature and pressure from a machine that includes power generating device 22 and a rotating component, such as but not limited to, a driveshaft 24, driveshaft yoke, Cardan universal joints 28 (U-joints), as best presented in FIG. 2, a double Cardan universal joints 30, as best presented in FIG. 4, or various transmission joint to determine operational data such as speed, acceleration, torque, horsepower rotational position and vibration due to imbalance. In the enabling embodiments, the assembly 20 is used with a vehicle that includes an engine, but it should be appreciated that the assembly could be used with other machines such as, but not limited to turbines, pumps or pulleys, with other types of power generating devices.

Figure 5:
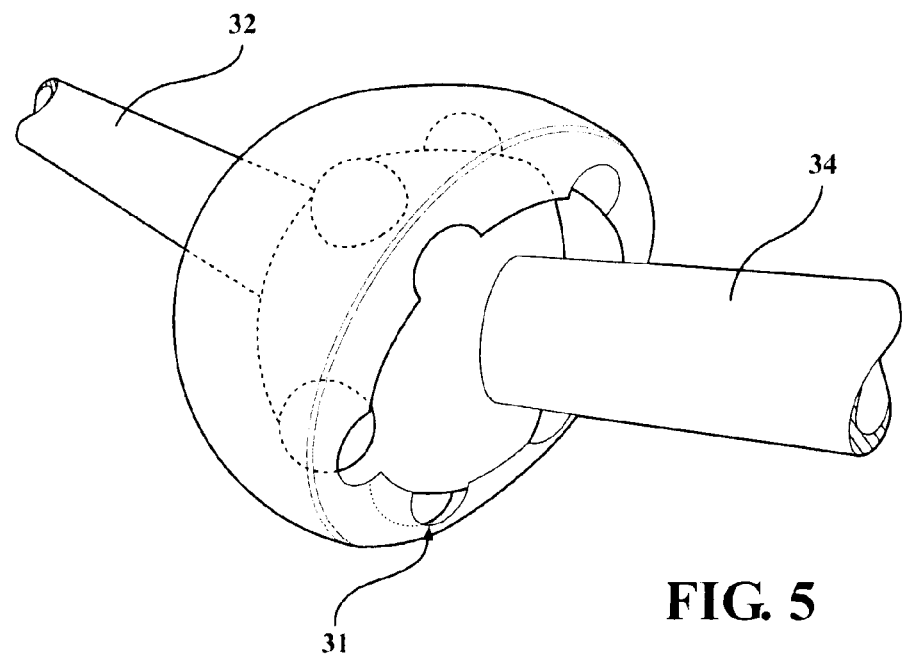
FIG. 5 is a perspective view of a Rzeppa constant velocity joint.

In the enabling embodiments, the assembly 20 acquires data from a joint 26 that transmits rotational movement from the transmission 23 to the driveshaft 24 and from the driveshaft 24 to the rear transaxle at an angle. Typical rear wheel drive applications have two or more such joints 26 between the transmission output and the rear differential. In the enabling embodiments, the joint 26 is a Cardan universal joint 28, as best presented in FIG. 2, and a double Cardan universal Cardan joint 30, as best presented in FIG. 3. It should be appreciated that in power transmission applications, other joints 26 could be used, such as but not limited to, a Thompson constant velocity joint 29, as best presented in FIG. 4, or a Rzeppa constant velocity joint 36, as best presented in FIG. 5. Further it, should be appreciated that the assembly 20 could acquire data from other rotating components of the vehicle such as, but not limited to, a driveshaft 24 or driveshaft yoke.

The joint 26 includes an input shaft and an output shaft 34 and a joining component 36 for interconnecting the input and output shafts. In the enabling embodiments, the joint 26 includes a generally cylindrical shaped input shaft 32 for being interconnected with the engine 22, through a transmission 23, and a generally cylindrical shaped output shaft 34 for being interconnected with the driveshaft 24 of the vehicle, and a joining component 36 for interconnecting the input shaft 32 and the output shaft 34 and for providing for pivotable movement between the input and output shafts 32, 34. It should be appreciated that the input and output shafts 32, 34 could have other cross-sectional shapes such as, but not limited to, a square cross section.

A sensor assembly 38 is interconnected with the rotating part of the machine for acquiring the operational data of the machine. In the enabling embodiments, the sensor assembly 38 is interconnected with the joint 26 for acquiring the operational data of the vehicle. It should be appreciated that the sensor assembly 38 could alternatively be attached to other rotating components of the vehicle such as, but not limited to the driveshaft 24 or driveshaft yoke. Further, a transceiver base unit 35 is wirelessly connected with the sensor assembly 38 for receiving the operational data from the sensor assembly 38 and for sending instructions to the sensor assembly 38 to change the preferred mode of operation of the sensor assembly 38 and/or vehicle. The sensor assembly 38 includes a remote transceiver 43 for sending data and receiving instructions from the transceiver base unit 35. In the enabling embodiments, the transceiver base unit 35 is interconnected with the vehicle in an accessible location to operators; however, it should be appreciated that the transceiver base unit could be positioned at any location depending on the application of the sensor assembly 38.

Data from the remote transceiver 43 is wirelessly transmitted (typically in the 2.45 Ghz range) to the transceiver base unit 35 that receives the digital signal and passes it on to either digital via USB, SPI, two-wire, or USART or other form of digital outputs, or converts it back to analog signals for analog outputs. Commands can be sent from the transceiver base unit 35 to the remote transceiver 43 to setup active data channels, set data rates, change transmission channel and various other operating characteristics. It should be appreciated that the transceiver base unit 35 and remove transceiver 43 could communicate with each other in others ways such as, but not limited to, a Bluetooth connection.

The sensor assembly 38 includes a circuit board 40 that is interconnected with the joint 26. It should be appreciated that the circuit board 40 could be interconnected with the joint in various ways such as, but not limited to, an adhesive or nuts and bolts. In the enabling embodiment, the circuit board generally has a rectangular shape and defines a front face. It should be appreciated that the circuit board 40 could have various shapes, ideally to match a portion of the joint 26 which it is being connected to. A rechargeable battery 42 is interconnected with the joint 26 and is electrically connected with the sensor assembly 38 for providing electric power to the sensor assembly 38. The circuit board 40 further includes a microprocessor 44 that is electrically connected with the sensor assembly 38 and transceiver 43 for receiving and interpreting the operational data from the sensor assembly 38 and rotating component and for directing the electric power from the battery 42 to the sensor assembly 38. It should be appreciated that the transceiver 43 could be positioned on the circuit board 40, or disposed at another location. It should be appreciated that a universal Cardan joint 28 is a good location for installation of such a sensor assembly 38 as the sensor can be mounted perpendicular to and centered with to the rotation axis, thus, eliminating inertial loads and imbalance due to the sensor weight.

The sensor assembly 38 also includes at least one accelerometer 46 for measuring the rotational speed and vibrations of the rotating component. In the enabling embodiments, the accelerometer measures the rotational speed and vibrations of the joint 26 to determine the horsepower transmitted through the drive shaft and for measuring vibrations of the drive shaft to send an accelerometer signal corresponding to the rotational speed and/or vibrations. In the enabling embodiments, two 3-axis Microelectromechanical Systems (MEMS) accelerometers 46 are interconnected with the circuit board 40. It should be appreciated that different types, and any number of accelerometers 46 could be used, and they could be disposed at various locations on the rotating component of the automobile. In the enabling embodiment, the circuit board 40 is placed such that the face of the circuit board 40 extends perpendicular to the axis A of rotation, such that the accelerometers 46 are positioned on the circuit board 40 to negate gravitational or inertial accelerations of the rotating component of the vehicle in order to determine rotational speed, rotational angle, angular accelerations, and radial disturbances. Further, the accelerometers 46 are positioned adjacent to the radial center of the joint 26, at its axis of rotation, in order to keep the radially oriented axes of the accelerometer(s) 46 from saturating at high engine 22 speeds due to the inertial forces. For example, at ¼" radius, a shaft rotating at 8000 rpm will generate 455 G's in the radial direction. The maximum allowable rotational speed for which the device can produce useful radial acceleration data can therefore be determined based on the maximum G-rating of the accelerometer 46 and the radial placement of the accelerometer 46 on the circuit board 40. Typically for performance vehicle applications, a system would have two 450 G accelerometers 46 placed at a radius of approximately ~¼". Accordingly, it should be appreciated that the circuit board 40 is positioned such that its face extends perpendicular to the axis A of rotation, and the accelerometers 46 are positioned radially adjacent to the axis A.

In addition, access to the axis A of rotation allows two accelerometers 46 to be installed on a single circuit board 40 with opposite directions of inertial loads acting on their positive radial axes while gravitational loads are acting in the same direction for each. Similarly, the two accelerometers 46 can be installed on the board such that opposite directions of gravitational loads are acting on their positive radial axes while inertial loads are acting in the same direction. Likewise, the accelerometers 46 can have opposite directions of rotational accelerations acting on their positive circumferential axes while gravitational loads are acting in the same direction for each. It should further be appreciated that the accelerometers 46 are capable of sensing rotational direction from the gravitational quadrature signals associated with two perpendicular accelerometer axes.

The two accelerometers 46 can be installed on the board such that opposite directions of gravitational loads are acting on their positive circumferential axes while rotational accelerations are acting in the same direction. This enables measurement of angular position, velocity and acceleration as different acceleration signatures can be isolated. Angular position measurements, derived solely from rotating components, can be used as a clocking source for spatially resolved Analogue to Digital (A-D) conversions of instantaneous torque measurements. Angular velocity measurements can be used with instantaneous torque measurements to provide real time horsepower supplied to and/or absorbed from the load.

In the enabling embodiments wherein the rotating component of the vehicle is a universal Cardan joint 28, the accelerometer signal from the accelerometer 46 can determine an axial alignment angle between the input and output shafts 32, 34. Furthermore, the accelerometer signals can be used to determine axial inclination by considering the Direct Current (DC) component of the axially-aligned axis. Accuracy is improved over a wide range of radial acceleration (i.e., shaft rotational speed) as the remote is capable of digitally changing the range of the MEMS accelerometers 46 dynamically to best resolve the instantaneous magnitude of radial acceleration. As best presented in FIG. 10, dual 3-axis MEMS gyroscopes 47 can be added to supplement readings from the accelerometer 46 with angular velocity to provide more accurate position and orientation measurement. It should be appreciated that other gyroscopes could be used.

Angular shaft accelerations/decelerations result from changes in input torque and/or output load, and from changes in upstream and/or downstream inertial loads applied to the driveshaft 24. During positive torque events (i.e., input torque exceeds output torque), torque and angular acceleration sensor measurements can be acquired to determine downstream inertia loads from the sensor assembly 38. For example, in the vehicle, the downstream inertial loads result from the rear differential, wheels, and road load which can vary with vehicle weight and payload, vehicle inclination, wheel traction, etc. During negative torque events, torque and angular acceleration can be used to determine upstream inertial loads. In another example, the upstream inertial loads are affected by the operating characteristics of the transmission, clutch and engine 22 which can vary with gear changes, clutch engagement, cylinder fuel/air management, engine accessory loads, etc.

Figure 11A:
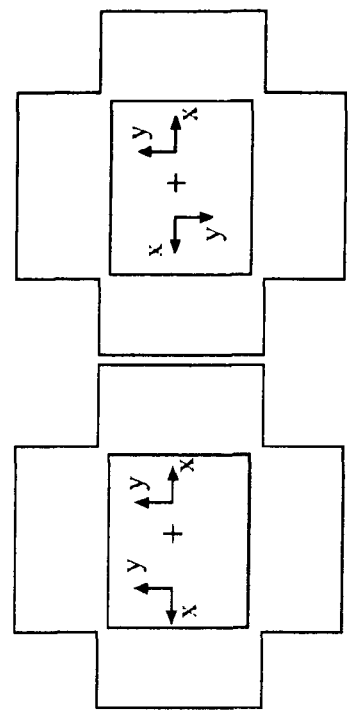
FIG. 11A presents the orientation of the accelerometer signals of FIG. 11B.
Figure 11B:
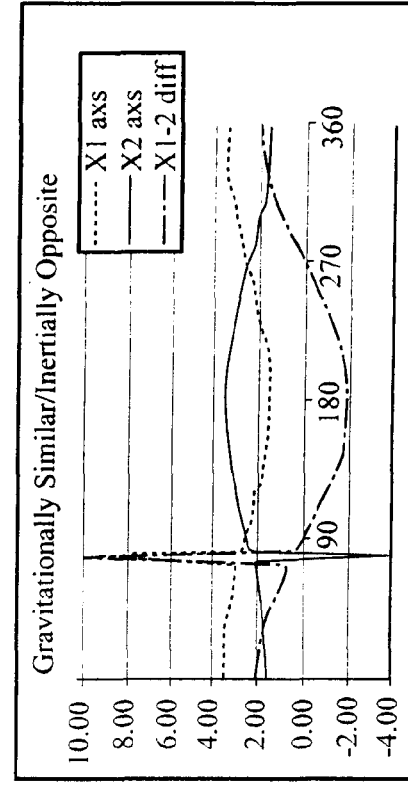
FIG. 11B is a plot demonstrating how dual accelerometer signals can be used to determine rotational speed of the rotating component.
Figure 12A:
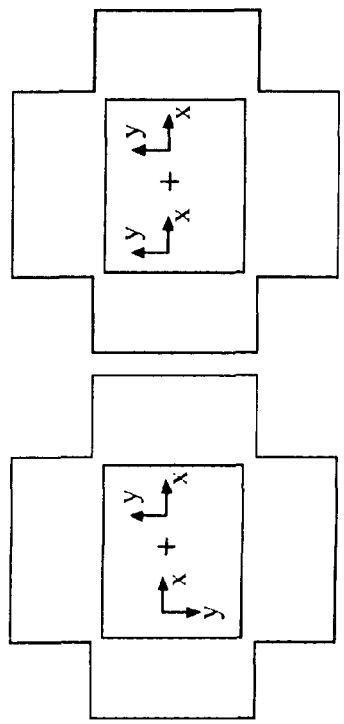
FIG. 12A presents the orientation of the accelerometer signals of FIG. 12B.
Figure 12B:
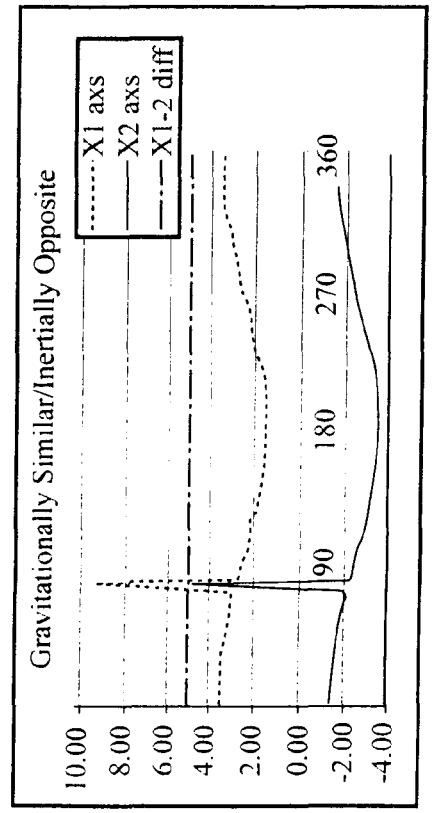
FIG. 12B is a plot demonstrating how dual accelerometer signals can be used to determine radial disturbances on the rotating component.
Figure 13A:
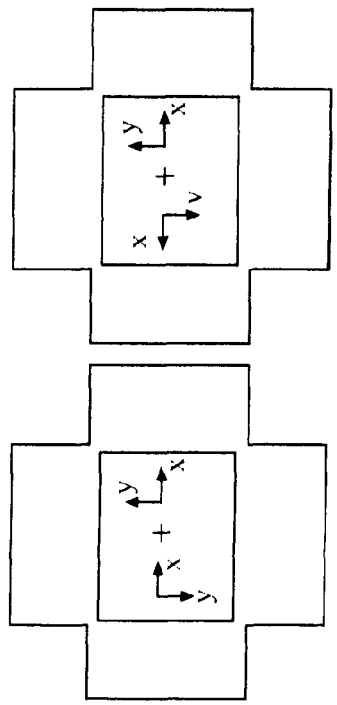
FIG. 13A presents the orientation of the accelerometer signals of FIG. 13B.
Figure 13B:
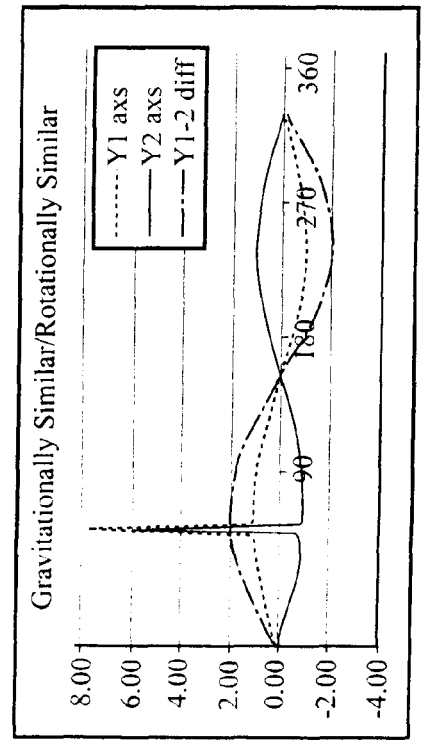
FIG. 13B is a plot demonstrating how dual accelerometer signals can be used to determine radial disturbances on the rotating component.

Further, engine speed can be determined from the accelerometers 46 as illustrated in FIG. 11B. The signal difference between the x-axes as shown in FIG. 11B is proportional to the square of the engine speed. The proportionality constant equals the radius at which the accelerometer 46 is mounted on the circuit board 40 from the center of rotation of the joint 26. In the absence of radial disturbances, the period generated as presented in FIG. 12B and FIG. 13B is measured using a comparator on the microprocessor 44 to more accurately determine engine 22 speed. Multiple periods can be measured and averaged to produce an even higher resolution of engine 22 speed averaged over the duration of the measurement event. Measurement of multiple periods can furthermore be used to eliminate erroneous period measurements (as determined by its standard deviation) resulting from radial disturbances to the rotating component.

Figure 14A:
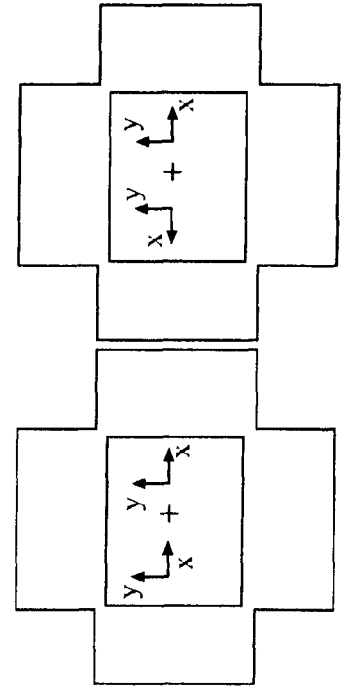
FIG. 14A presents the orientation of the accelerometer signals of FIG. 14B.
Figure 14B:
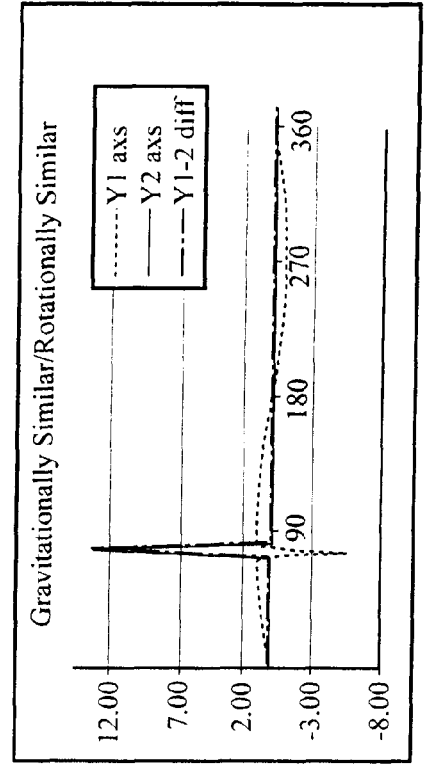
FIG. 14B is a plot demonstrating how dual accelerometer signals can be used to determine rotational speed of the rotating component.

Angular acceleration can be determined as further presented in FIG. 14B. The signal difference between the y-axes as presented in FIG. 14B equals twice the angular acceleration. As presented in FIGS. 12B and 13B a radial disturbance on the rotating component can be determined. Radial vibrations may be caused by imbalance in the rotating component or by bulk motion of the vehicle that contains the rotating component (e.g. —a vehicle hitting a pothole). The magnitude of the radial disturbance can be found from the root of the sum of the squares of the two signals (i.e. $-(S_A^2+S_B^2)$).

Figure 7:
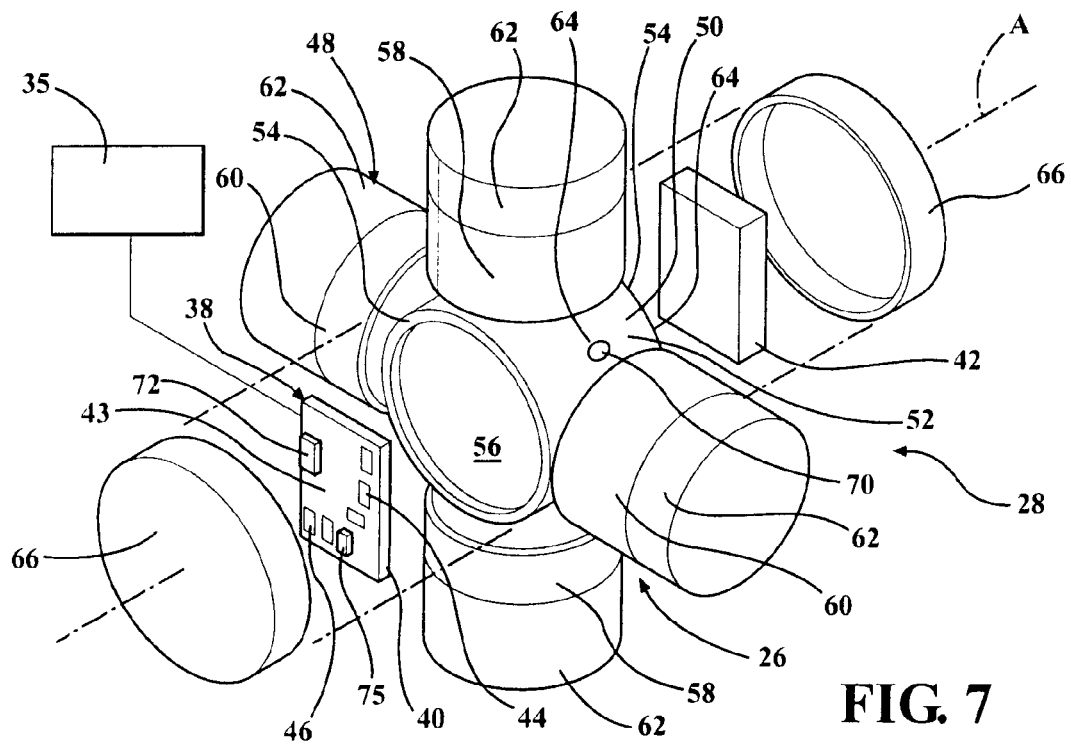
FIG. 7 is a perspective exploded view of the body of a Cardan universal joint and sensor assembly.

As best presented in FIG. 7, in the enabling embodiment wherein the joint 26 is a universal Cardan joint 28, the universal Cardan joint 28 includes a body 48 that has a generally cross shape that includes a central tube 50 that has a generally tubular shape and extends along an axis A of rotation, and defines an outer wall 52 that extends between a pair of ends 54 and defines a cavity 56 therein. The body 48 further includes a pair of input trunnions 58 that extend from opposing sides of the outer wall 52 of the central tube 50 in alignment with one another, and a pair of output trunnions 60 that extend perpendicularly to the input trunnions 58 on opposing sides of the outer wall 52 of the central tube 50. A bearing cap 62 is disposed about each of the input and output trunnions 58, 60 for rotating about the trunnions 58, 60. The outer wall 52 of the central tube 50 defines four corner segments 64, each between one of the input trunnions 58 and one of the output trunnions 60.

When the accelerometer axes are aligned with the input trunnions 58 (constant velocity) or output trunnion 60 (oscillating velocity) of the joint 26, a frequency at twice the rotational frequency of the input shaft 32 will be superimposed on the rotational frequency signature with an amplitude proportional to the angle between the input and output shafts 32, 34 as the output shaft 34 cyclically accelerates and decelerates through two cycles every revolution. The amplitude can be used to dynamically determine the relative shaft angle between the input and output shafts 32, 34. It should be appreciated that due to the oscillatory nature of the joint 26, when implemented with a non-zero angle between input and output shafts 32, 34, provides adequate acceleration to detect rotational speeds in either horizontal or vertical shaft orientations.

In the enabling embodiments, as best presented in FIG. 7, the circuit board 40 is disposed in the cavity 56 of the central tube 50. The battery 42 is also disposed in the cavity 56 of the central tube 50 adjacent to the circuit board 40. An end cap 66 removably seals each of the ends 54 of the central tube 50 for sealing the cavity 56 and housing the pin bearings. It should be appreciated that the circuit board 40 and battery 42 could be positioned at other locations of the rotating component.

It should be appreciated that sealing the circuit board 40 and battery 42 in the cavity 56 advantageously protects the circuitry from harsh environmental conditions and minimizes inertial load imbalance resulting from the system installation.

In the first enabling embodiment, the bearing caps 62 of the input trunnions 58 are interconnected with the input shaft 32 through a U-shaped trunnion yoke 33 for rotating with the input shaft 32. Further, the bearing caps 62 of the output trunnions 60 are interconnected with the output shaft 34 for rotating with the output shaft 34.

Figure 3:
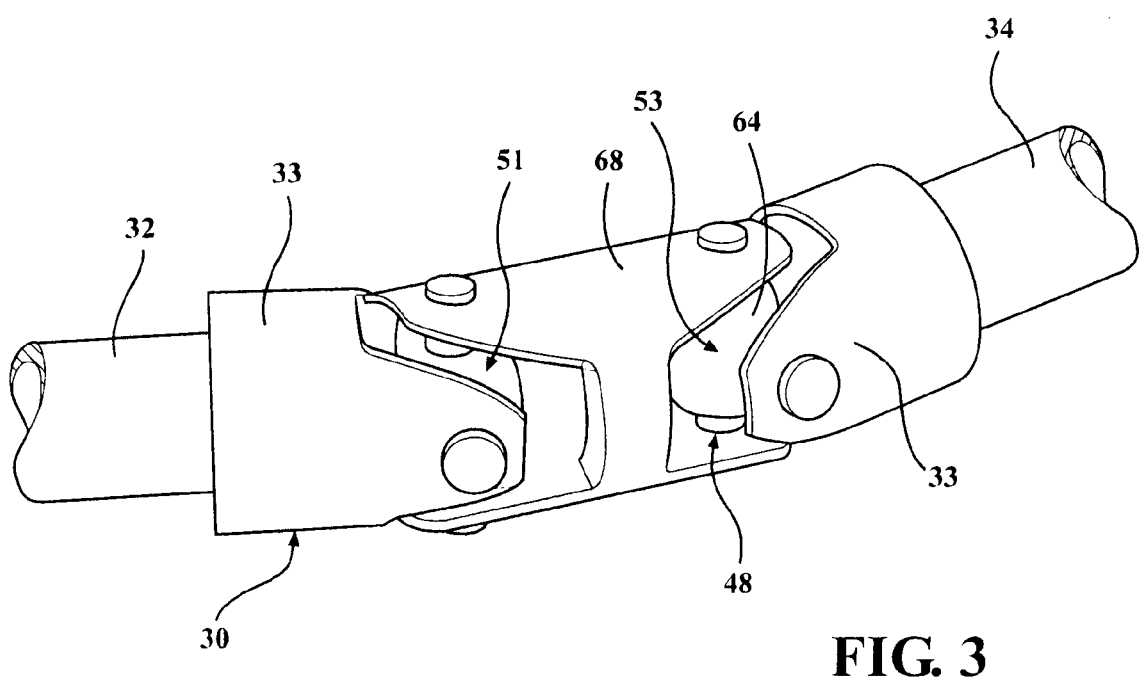
FIG. 3 is a perspective view of a double Cardan universal joint.

In the second enabling embodiment, as best presented in FIG. 3, the joint 26 is a double Cardan universal joint 30 which includes a first body 51 and a second body 53. The bearing caps 62 of the input trunnions 58 of the first body 48 are interconnected with the input shaft 32 for rotating with the input shaft 32. The bearing caps 62 of the output trunnions 60 of the second body 48 are interconnected with the output shaft 34 for rotating with the output shaft 34. Further, a connection cylinder 68 that has a generally cylindrical shape is interconnected with the output trunnions 60 of the first body 48 and the input trunnions 58 of the second body 48 for transferring rotational movement from the first body 48 to the second body 48 to spin the output shaft 34 at the same constant velocity as the input shaft 32. It should be appreciated that the connection cylinder 68 could have other cross-sectional shapes such as, but not limited to, a square cross-section.

Figure 6:
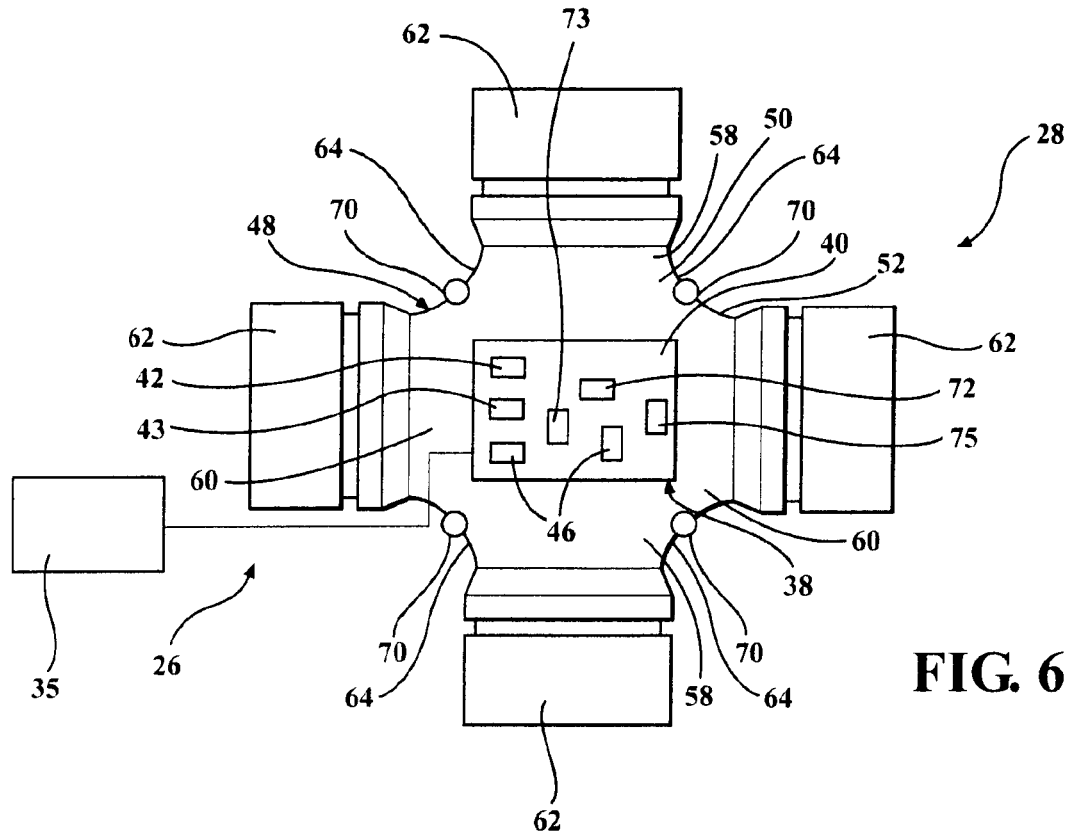
FIG. 6 is a side view of a body of a Cardan universal joint with a schematic of the sensor assembly.

As best presented in FIG. 6, the sensor assembly 38 further includes at least one strain gauge 70 for detecting the strain on the joint 26. In the enabling embodiments, a strain gauge 70 is disposed on each of the corner segments 64 for detecting the strain at each of the corner segments 64 for optimal placement in a peak strain location. Opposite diagonal strain gauges 70 experience similar compressive/tensile forces. The strain gauges 70 form the four quadrants of a full Wheatstone bridge circuit. It should further be appreciated that inherent compressive and tensile forces in each quadrant of the joint provide optimal compressive/tensile strain fields for subsequent strain gauge 70 based measurements. In an embodiment of the circuit board 40, the strain gauges 70 can be directly integrated into the four corners of a flexible circuit board 40 to eliminate wiring, facilitate accurate placement, and reduce the complexity of installation. The entire circuit board 40 with integrated gauges could be adhesively mounted to the u-joint surface in a single operation. It should be appreciated that the strain gauge 70 could be positioned at various other locations on the rotating component such as, but not limited to, trunnion yolk 33.

It should be appreciated that the strain gauge 70 components can advantageously be pre-installed on a U-joint and readily installed in a power transmission application without the need for system calibration of strain rate after installation.

The integrated sensor assembly 38 is capable of transmitting high-speed signals directly to a stationary base unit 35, or integrating high speed signals and calculated parameters on-board over a number of rotational events and subsequently performing lower speed transmission of calculated and averaged values. Re-transmission and AES encryption algorithms can be used to assure that data transfer is reliable and safe.

The sensor assembly 38 further includes at least one temperature sensor 72 for measuring the temperature of the rotating component. In the enabling embodiments, the temperature sensor 72 is interconnected with the joint 26. It should be appreciated that any type of temperature sensor 72 could be used such as, but not limited to, thermocouples, and resistance thermometers. It should be appreciated that readings from the temperature sensor 72 can be used to detect early signs of performance degradation and potential failure of the driveshaft 24 or other rotating components.

Temperature sensors 72 placed near each of the trunnions 58, 60 on the back side of the circuit board 40 can directly measure significant thermal gradients between trunnions 58, 60, thus, indicating a potential failure of the roller pin bearings within a specific bearing cap 62.

The sensor assembly 38 further includes at least one pressure sensor 73 for measuring the fluid pressure adjacent to the joint 26. It should be appreciated that depending on the application of the assembly 20, the pressure sensor 73 can measure the pressure of any fluid such as, but not limited to, air, water, lubricants, hydraulic fluid. It should further be appreciated that on-board air density measurements, via the temperature and pressure sensors 72, 73, provide real time corrected horsepower from measured actual horsepower.

The sensor assembly further includes a global positioning system (GPS) sensor 75 for detecting speed and location data of the vehicle. It should be appreciated that the speed and location data can be used in conjunction with other operational data collected by the sensor assembly 75. For example the GPS data could pinpoint what speed the vehicle was traveling at, and the specific location the vehicle was located at during a particular event. It should be appreciated that the GPS sensor 75 could be positioned on the circuit board 40 or any other location of the vehicle and rotating component.

An energy harvesting assembly 74 is interconnected with the joint 26 and is electrically connected with the battery 42 and the sensor assembly 38 for harvesting energy from the joint 26 to provide electric power to the sensor assembly 38 and the battery 42 for charging the battery 42. It should be appreciated that the energy harvesting assembly 74 can provide a continuous power supply for the sensor assembly 38.

Figure 8:
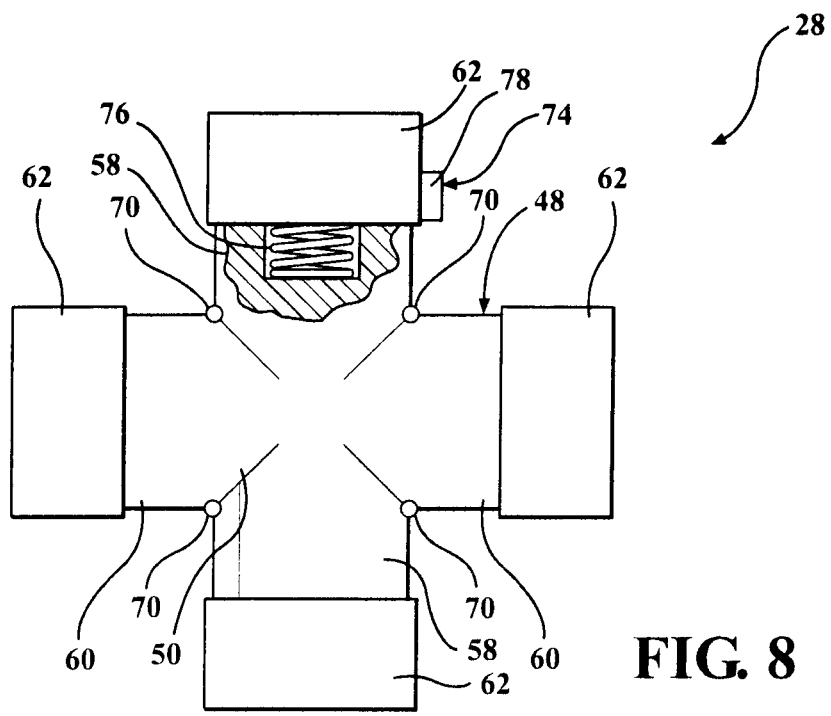
FIG. 8 is a side view of a body of a Cardan universal joint with an energy harvesting assembly.
Figure 9:
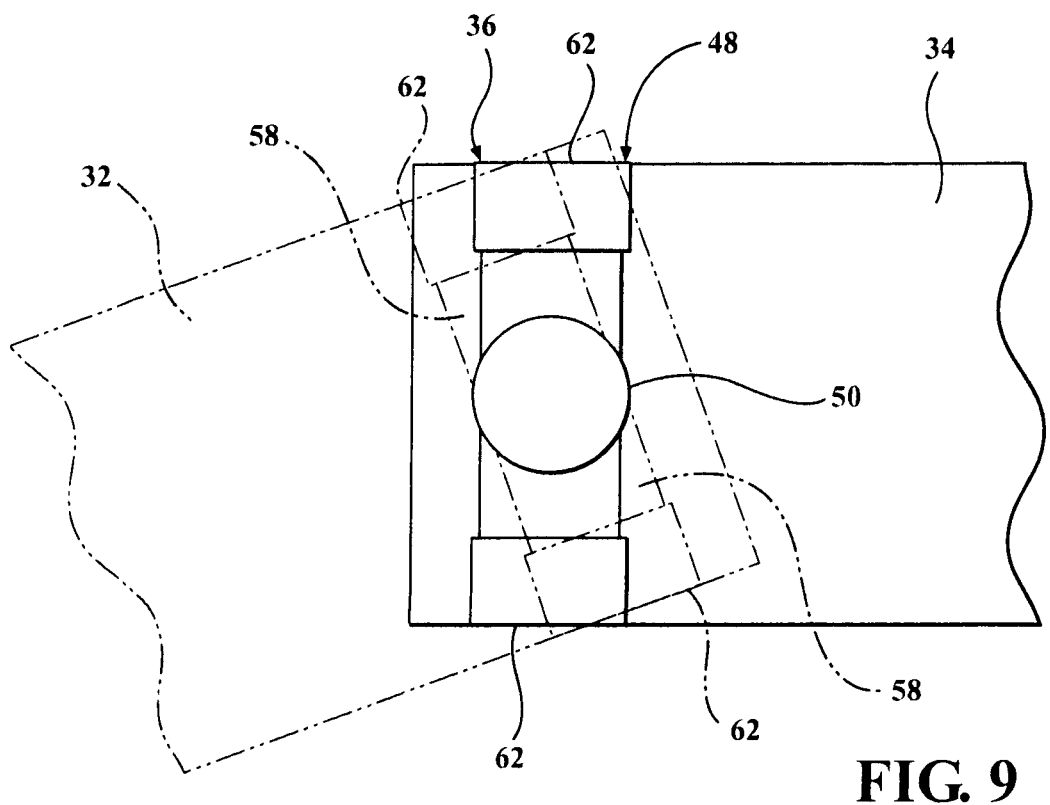
FIG. 9 is a side view of a Cardan Universal joint with input and output shafts.

As best presented in FIG. 8, in an embodiment of the disclosure, the energy harvesting assembly 74 is an inductive harvesting assembly that includes a coil 76 that is interconnected with the body 48 of the joint 26, and a magnet 78 that is interconnected with the bearing cap 62 of at least one of the joints 26, for rotating with the joint 26 for generating electricity. The magnet 78 and the coil 76 are electrically connected with the sensor assembly 38 for providing electric power to the sensor assembly 38. It should be appreciated that the coil 76 could alternatively be placed on any of the input or output trunnions 58, 60 and the magnet 78 could alternatively be positioned on the trunnion yoke 33.

In the first enabling embodiment using a universal Cardan joint 28, the output shaft 34 does not operate at constant velocity but rather has a periodic velocity that is twice the frequency of the input shaft 32 rotational speed. The trunnions 58, 60 move cyclically relative to the bearing cap 62 at twice the frequency of the input shaft 32. This relative motion, which occurs even with a constant input shaft 32 velocity, provides for an ideal source of inductive charging for supplying current to the sensor assembly 38 and/or a power storage cell. The magnets 78 mounted on the bearing caps 62 or trunnion yoke provide a static reference point relative to the motion of the body 48 for inductive power generation which can then be used to continuously power the sensor or supply energy to a charge storage device. Analogue to Digital (A-D) monitoring of the inductive signal can further provide a clocking and triggering source for spatially-resolved A-D torque acquisitions and speed sensing. Motion of the body 48 alone can be used as an inertially dynamic source for inductive and piezo-electric harvesting without the need for a relative static mounting location on the bearing cap 62 or trunnion yoke 33. Similarly, motion of the output shaft 34 (or the body 48 of a double Cardan universal joint 30) can provide an inertially dynamic energy source, as the output shaft 34 of a u-joint experiences two acceleration/deceleration cycles for each rotational cycle of the input shaft 32 of the joint 26.

Figure 10:
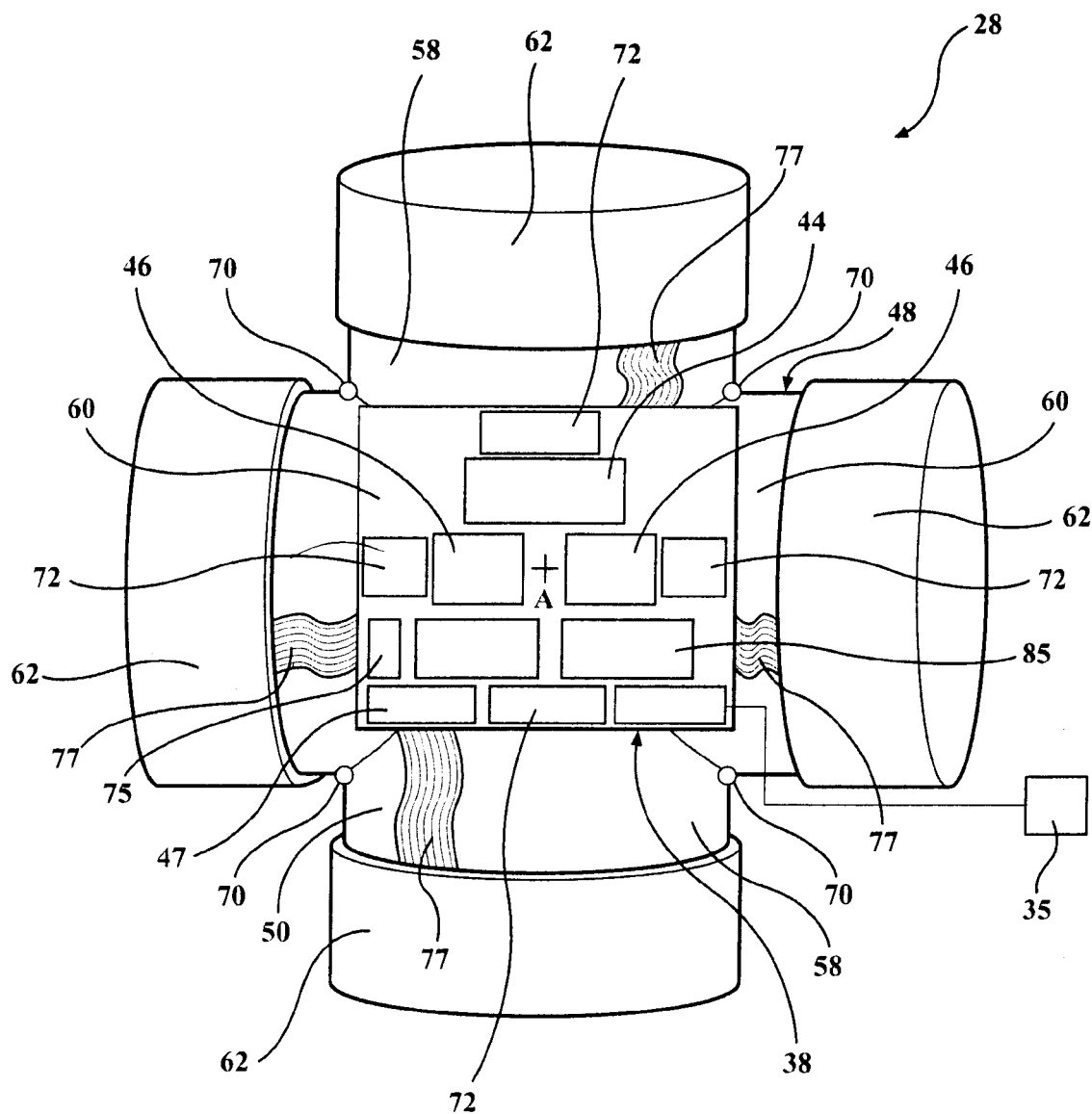
FIG. 10 is a side view and schematic of a Cardan universal joint and a schematic of the sensor assembly.

In another embodiment of the disclosure, as best presented in FIG. 10, the energy harvesting assembly 74 is a piezoelectric harvesting assembly that includes a piezoelectric flexible membrane 77 made of a ceramic material or a polymeric material and is interconnected with the joint 26 for deflecting in response to movement of the joint 26 to produce electricity. The energy harvesting assembly 74 further includes a charge management device 85 which is electrically connected with the piezoelectric flexible membrane 77 for receiving electricity from the piezoelectric flexible membrane. The charge management device 84 is electrically connected with the sensor assembly 38 for providing electric power to the sensor assembly 38. The piezoelectric flexible membrane 77 can be tuned with an external mass to deflect at resonant frequencies at or near the typical operational frequencies of the rotating shaft. Deflection of the polymer portion of the piezo-electric flexible membrane 77 as a result of the oscillations creates a charge field which can be rectified and stored as electrical energy using a charge management device. The harvested energy may supply a portion of the required current needed to operate the sensors, thus, extending the duration between battery 42 charges, or may even supplement the entire load requirement, thus, enabling indefinite operation of the sensor assembly 38.

The remote system is equipped with a battery monitoring circuitry 39 as well as detection circuitry 41 of active harvesting to enable intelligent charge management and circuit activation upon obtaining adequate energy storage.

In another embodiment of the disclosure, the energy harvesting assembly 74 is a peltier harvesting assembly which includes a bi-directional peltier controller which is interconnected with the joint 26 for generating electricity. The peltier controller is electrically connected with the sensor assembly 38 for providing electric power to the sensor assembly 38. Thermal energy generated within the joint 26 is another viable energy harvesting source by using a Peltier device. With a bi-directional Peltier controller (i.e., gradients in either direction can be harvested) a single 10 mm square Peltier controller has demonstrated the ability to produce adequate charge current to power our integrated sensor device at transmission rates up to 100 Hz with no more than a 5 C temperature difference between the rotating shaft and ambient air. Higher temperature differences can support higher transmission rates. A universal joint 26 is unique in that it generates heat as a result of its motion. In an embodiment, needle bearings within the bearing cap 62 generate frictional heat as they roll within a viscous lubricant transferring load between the bearing cap 62 and trunnion. The slightest increase in temperature between the u-joint and ambient can provide the necessary thermal gradient to power the device. Even when the shaft is inactive, diurnal changes in temperature continuously warm and cool the thermal mass of the rotating device providing a continuously varying gradient for thermal-electric battery 42 charging. The unique aspect of this charging technique is that power harvesting is not dependent on motion and can occur even when the shaft is not in use. A combined strategy (i.e., thermal-gradient and motion-based) provides a robust charging and supply system that assure functionality over a long operational life.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An assembly for acquiring operational data from a machine including a power generating device and a rotating component interconnected with the power generating device for transmitting power from the power generating device comprising;
   a sensor assembly for being interconnected with the rotating component for sensing the operational data of the machine,
   said sensor assembly including a microprocessor for receiving and interpreting said operational data,
   said sensor assembly further including at least one accelerometer for measuring the rotational speed of the rotating component to determine the horsepower being transmitted through the rotating component and for measuring vibrations of the rotating component,
   said sensor assembly further including at least one temperature sensor for being interconnected with the rotating component for measuring the temperature of the rotating component,
   said sensor assembly further including at least one pressure sensor for being interconnected with the rotating component for measuring the fluid pressure adjacent to said joint,
   said sensor assembly further including at least one strain gauge for being interconnected with the rotating component for detecting the strain on the rotating component,
   an energy harvesting assembly for being interconnected with the rotating component and electrically connected with said sensor assembly for harvesting energy from the rotating component to provide electric power to said sensor assembly.

2. An assembly as set forth in claim 1 wherein said rotating component rotates about an axis and said accelerometer is a pair of accelerometers each being positioned adjacent to said axis.

3. An assembly as set forth in claim 2 wherein said accelerometers are disposed on opposing sides of said axis and spaced perpendicularly from said axis in alignment with one another and equally spaced from said axis.

4. An assembly as set forth in claim 1 and further including a transceiver base unit in wireless communication with said sensor assembly for receiving the operational data from the machine and for providing instructions to said sensor assembly and said sensor assembly further includes a global positioning system sensor for collecting speed and location data of the machine.

5. An assembly as set forth in claim 1 and further including a joint for transmitting rotational movement from the power generating device to a driveshaft of the machine,
   said joint including an input shaft for being interconnected with the rotating component of the power generating device and an output shaft for being interconnected with the driveshaft and a joining component for interconnecting said input shaft and said output shaft and providing for pivotable movement between said input and output shafts,
   said sensor assembly being interconnected with said joint for acquiring the operational data of the machine,
   said sensor assembly including a circuit board interconnected with said joint and electrically connected with said sensor assembly,
   a battery being rechargeable interconnected with said joint and electrically connected with said sensor assembly for providing electric power to said sensor assembly, said circuit board including a microprocessor electrically connected with said sensor assembly for receiving and interpreting said operational data and for directing said electric power from said battery to said sensor assembly, said circuit board including at least one accelerometer for measuring the rotational speed of said joint to determine the horsepower being transmitted through said driveshaft and for measuring vibrations of said driveshaft, said sensor assembly further including at least one temperature sensor for measuring the temperature of said joint, said sensor assembly further including at least one pressure sensor for measuring the fluid pressure adjacent to said joint, said sensor assembly further including at least one strain gauge for detecting the strain on said joint, an energy harvesting assembly interconnected with said joint and electrically connected with said battery and said sensor assembly for harvesting energy from said joint to provide electric power to said sensor assembly and said battery for charging said battery.

6. An assembly as set forth in claim 5 wherein said joint is a universal cardan joint, said universal cardan joint including a body having a generally cross shape including a central tube having a generally tubular shape and defining an outer wall extending between a pair of ends and defining a cavity, said body further including a pair of input trunnions extending from opposing sides of said outer wall of said central tube in alignment with one another and a pair of output trunnions extending perpendicularly to said input trunnions on opposing sides of said outer wall of said central tube, a bearing cap disposed about each of said input and output trunnions for rotating about said trunnions, said outer wall of said central tube defining four corner segments each between one of said input trunnions and one of said output trunnions, one of said strain gauges being disposed on each of said corner segments for detecting the strain at each of said corner segments, said circuit board being disposed in said cavity of said central tube, said battery being disposed in said cavity of said central tube adjacent to said circuit board, an end cap removably sealing each of said ends of said central tube for sealing said cavity.

7. An assembly as set forth in claim 6 wherein said bearing caps of said input trunnions are interconnected with said input shaft for rotating with said input shaft, said bearing caps of said output trunnions are interconnected with said output shaft for rotating with said output shaft.

8. An assembly as set forth in claim 7 wherein said joint is a double Cardan universal joint, said double Cardan universal joint including a first body and a second body each having a generally cross shape including a central tube having a generally tubular shape and defining an outer wall extending between a pair of ends and defining a cavity, said bearing caps of input trunnions of said first body being interconnected with said input shaft for rotating with said input shaft, said bearing caps of said output trunnions of said second body interconnected with said output shaft for rotating with said output shaft a connection cylinder having a generally cylindrical shape interconnected with said output trunnions of said first body and said input trunnions of said second body for transferring rotational movement from said first body to said second body to spin said output shaft at the same constant velocity as said input shaft.

9. An assembly as set forth in claim 8 wherein said energy harvesting assembly is an inductive harvesting assembly including a coil interconnected with at least one of said first body and said second body of said joints and a magnet is interconnected with said bearing cap of at least one of said joints and for rotating with said joint for generating electricity, said magnet and said coil are electrically connected with said sensor assembly for providing electric power to said sensor assembly.

10. An assembly as set forth in claim 6 wherein said energy harvesting assembly is a piezo-electric harvesting assembly including a piezoelectric wafer made of one of a ceramic material and a polymeric material and interconnected with said joint for deflecting in response to movement of said joint to produce electricity, said piezo-electric harvesting assembly further including a charge management device being electrically connected with said piezoelectric wafer for receiving electricity from said piezoelectric wafer, said charge management device being electrically connected with said sensor assembly for providing electric power to said sensor assembly.

11. An assembly as set forth in claim 6 wherein said energy harvesting assembly is a peltier harvesting assembly including a peltier controller being bi-directional interconnected with said joint for generating electricity, said peltier controller is electrically connected with said sensor assembly for providing electric power to said sensor assembly.

12. An assembly for acquiring operational data from a vehicle including an engine and a driveshaft comprising;

a joint for transmitting rotational movement from the engine to the driveshaft, said joint including an input shaft having a generally cylindrical shape for being interconnected with the engine and an output shaft for being interconnected with the driveshaft and a joining component for interconnecting said input shaft and said output shaft and providing for pivotable movement between said input and output shafts, a sensor assembly being interconnected with said joint for acquiring the operational data of the vehicle, a transceiver base unit being in wireless communication with said sensor assembly for receiving said operation data from said sensor assembly and for sending instructions to said sensor assembly for changing the preferred mode of operation of at least one of said sensor assembly and the vehicle, said sensor assembly including a circuit board interconnected with said joint and electrically connected with said sensor assembly, said circuit board including a remote transceiver for receiving the data from the transceiver base unit, a battery being rechargeable interconnected with said joint and electrically connected with said sensor assembly for providing electric power to said sensor assembly, said circuit board including a microprocessor electrically connected with said sensor assembly and said transceiver base unit for receiving and interpreting said operational data and for directing said electric power from said battery to said sensor assembly, said circuit board including at least one accelerometer for measuring the rotational speed of said joint to determine the horsepower of said driveshaft and for measuring vibrations of said driveshaft, said joint extending along an axis of rotation, said joint having a body rotating about said axis of rotation, said circuit board having a face that extends perpendicular to said axis or rotation, said accelerometer being a pair of accelerometers each being positioned adjacent to said axis on opposing sides of said axis in alignment with one another and equally spaced from said axis, said sensor assembly further including at least one temperature sensor for measuring the temperature of said joint, said sensor assembly further including at least one pressure sensor for measuring the fluid pressure adjacent to said joint, said sensor assembly further including at least one strain gauge for detecting the strain on said joint, said sensor assembly further includes a global positioning system sensor for collecting the speed of the vehicle; and an energy harvesting assembly interconnected with said joint and electrically connected with said battery and said sensor assembly for harvesting energy from said joint to provide electric power to said sensor assembly and said battery for charging said battery.

13. An assembly as set forth in claim 12 wherein said joint is a universal cardan joint, said universal cardan joint including a body having a generally cross shape including a central tube having a generally tubular shape and defining an outer wall extending between a pair of ends and defining a cavity, said body further including a pair of input trunnions extending from opposing sides of said outer wall of said central tube in alignment with one another and a pair of output trunnions extending perpendicularly to said input trunnions on opposing sides of said outer wall of said central tube, a bearing cap disposed about each of said input and output trunnions for rotating about said trunnions, said outer wall of said central tube defining four corner segments each between one of said input trunnions and one of said output trunnions, one of said strain gauges being disposed on each of said corner segments for detecting the strain at each of said corner segments, said circuit board being disposed in said cavity of said central tube, said battery being disposed in said cavity of said central tube adjacent to said circuit board, an end cap removably sealing each of said ends of said central tube for sealing said cavity.

14. An assembly as set forth in claim 13 wherein said bearing caps of said input trunnions are interconnected with said input shaft for rotating with said input shaft, said bearing caps of said output trunnions are interconnected with said output shaft for rotating with said output shaft.

15. An assembly as set forth in claim 13 wherein said joint is a double Cardan universal joint, said double Cardan universal joint including a first body and a second body each having a generally cross shape including a central tube having a generally tubular shape and defining an outer wall extending between a pair of ends and defining a cavity, said bearing caps of said input trunnions of said first body being interconnected with said input shaft for rotating with said input shaft, said bearing caps of said output trunnions of said second body interconnected with said output shaft for rotating with said output shaft a connection cylinder having a generally cylindrical shape interconnected with said output trunnions of said first body and said input trunnions of said second body for transferring rotational movement from said first body to said second body to spin said output shaft at the same constant velocity as said input shaft.

16. An assembly as set forth in claim 15 wherein said energy harvesting assembly is an inductive harvesting assembly including a coil is interconnected with at least one of said first body and said second body of said joint and a magnet is interconnected with at least one of said bearing caps of at least one of said first body and said second body of said joint and for rotating with said joint for generating electricity, said magnet and said coil are electrically connected with said sensor assembly for providing electric power to said sensor assembly.

17. An assembly as set forth in claim 12 wherein said energy harvesting assembly is a piezo-electric harvesting assembly including a piezoelectric wafer made of one of a ceramic material and a polymeric material and interconnected with said joint for deflecting in response to movement of said joint to produce electricity, said piezo-electric harvesting assembly further including a charge management device being electrically connected with said piezoelectric wafer for receiving electricity from said piezoelectric wafer, said charge management device being electrically connected with said sensor assembly for providing electric power to said sensor assembly.

18. An assembly as set forth in claim 12 wherein said energy harvesting assembly is a peltier harvesting assembly including a peltier controller being bi-directional interconnected with said joint for generating electricity, said peltier controller is electrically connected with said sensor assembly for providing electric power to said sensor assembly.

19. An assembly for acquiring operational data from a vehicle including an engine and a rotating component interconnected with the engine for transmitting power from the engine comprising;

a sensor assembly for being interconnected with the rotating component for sensing the operational data of the vehicle, said sensor assembly including a microprocessor for receiving and interpreting said operational data, said sensor assembly further including at least one accelerometer for measuring the rotational speed of the rotating component to determine the horsepower being transmitted through the rotating component and for measuring vibrations of the rotating component, said sensor assembly further including at least one temperature sensor for being interconnected with the rotating component for measuring the temperature of the rotating component, said sensor assembly further including at least one pressure sensor for being interconnected with the rotating component for measuring the pressure of the air adjacent to said rotating component, said sensor assembly further including at least one strain gauge for being interconnected with the rotating component for detecting the strain on the rotating component, an energy harvesting assembly for being interconnected with the rotating component and electrically connected with said sensor assembly for harvesting energy from the rotating component to provide electric power to said sensor assembly.

20. An assembly as set forth in claim 19 wherein said rotating component rotates about an axis and said accelerometer is a pair of accelerometers each being positioned adjacent to said axis on opposing sides of said axis in alignment with one another and equally spaced from said axis.

* * * * *